(12) United States Patent
Lang et al.

(10) Patent No.: US 6,554,436 B1
(45) Date of Patent: *Apr. 29, 2003

(54) HORN SHAPED REARVIEW MIRROR WITH SUPPLEMENTAL A MIRROR

(75) Inventors: Heinrich Lang, Ergersheim (DE);
Albrecht Popp, Weihenzell (DE);
Jürgen Pfanz, Schillingsfürst (DE)

(73) Assignee: Lang-Mekra North America, LLC, Ridgeway, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,001

(22) Filed: Apr. 30, 1999

(30) Foreign Application Priority Data

Jan. 13, 1999 (DE) .......................... 199 00 987

(51) Int. Cl.$^7$ .......................... G02B 5/08; G02B 7/182; B60R 1/06
(52) U.S. Cl. .................. 359/841; 359/850; 359/864; 359/865; 359/872; 359/877
(58) Field of Search ................. 359/841, 850, 359/855, 863, 864, 865, 866, 872, 877

(56) References Cited

U.S. PATENT DOCUMENTS

| | | | |
|---|---|---|---|
| 2,322,431 A | | 6/1943 | Fischer |
| 3,170,985 A | * | 2/1965 | Katulich ............ 359/864 |
| 3,291,435 A | | 12/1966 | Herr |
| 3,375,053 A | * | 3/1968 | Ward ................. 359/864 |
| 3,383,152 A | | 5/1968 | Ward |
| 3,408,136 A | | 10/1968 | Travis |
| 3,424,517 A | | 1/1969 | Budreck |
| 3,448,553 A | | 6/1969 | Herr et al. |

(List continued on next page.)

FOREIGN PATENT DOCUMENTS

| | | | |
|---|---|---|---|
| CA | 1095008 | | 2/1981 |
| DE | 2537876 | | 3/1979 |
| DE | 9108483.0 | | 1/1992 |
| DE | 4200744 A1 | | 7/1993 |
| DE | 3207925 | * | 9/1993 |
| DE | 19513773 | | 10/1995 |
| DE | 4429604 | * | 2/1996 ................. 359/865 |
| DE | 8905801 | | 8/1998 |
| DE | 0865967 | * | 9/1998 ................. 359/841 |
| EP | 0396930 | * | 11/1990 ................ 359/850 |
| EP | 0399401 A1 | | 11/1990 |
| EP | 0895897 | * | 2/1999 |

OTHER PUBLICATIONS

Verified Translation of German Ref. No. G 91 08 483.0.
Verified Translation of German Patent No. DE 42 00 744 A1.
Verified Translation of European Patent No. EP 0 761 502 B1.
Verified Translation of German Patent No. G 89 05 801.1.
U.S. patent application No. 08/804,205, filed Feb. 21, 1997 (Attorney Docket No. LMX–21).

(List continued on next page.)

Primary Examiner—Ricky D. Shafer
(74) Attorney, Agent, or Firm—Dority & Manning, P.A.

(57) ABSTRACT

A horn shaped rearview mirror assembly for vehicles is disclosed including a support structure for mounting the mirror assembly to the vehicle, and a support arm including a carrier structure having a vehicle end and a free end, the vehicle end connected to the support structure. The support arm also includes a molded component secured to the carrier structure, the molded component including a mirror housing. A main rearview mirror is affixed to the mirror housing for providing the driver a rearview of the vehicle, and a single supplemental mirror is affixed to the mirror housing above the main mirror for providing the driver a view of at least two dead zones disposed about the vehicle.

19 Claims, 7 Drawing Sheets

U.S. PATENT DOCUMENTS

| | | | |
|---|---|---|---|
| 3,476,464 A | 11/1969 | Clark | |
| 3,508,815 A | 4/1970 | Scheitlin et al. | |
| 3,563,638 A | 2/1971 | Panozzo | |
| 3,599,926 A | 8/1971 | Takahashi | |
| 3,609,014 A | 9/1971 | Kurz | |
| 3,889,915 A | 6/1975 | Hashiguchi et al. | |
| 4,105,295 A * | 8/1978 | Skilliter | 359/866 |
| 4,125,244 A | 11/1978 | Lukey | |
| 4,174,823 A | 11/1979 | Sutton et al. | |
| 4,197,762 A | 4/1980 | Yamana | |
| 4,349,247 A * | 9/1982 | Koyama et al. | 359/863 |
| 4,394,066 A | 7/1983 | Sharp | |
| 4,422,724 A | 12/1983 | Otsuka et al. | |
| 4,457,146 A | 7/1984 | Weinerman | |
| 4,549,786 A | 10/1985 | Albers et al. | |
| 4,592,529 A | 6/1986 | Suzuki | |
| 4,613,107 A | 9/1986 | Vitaloni | |
| 4,678,294 A | 7/1987 | Van Nostrand | |
| 4,678,295 A | 7/1987 | Fisher | |
| 4,679,158 A | 7/1987 | Tate | |
| 4,701,037 A | 10/1987 | Bramer | |
| 4,764,004 A | 8/1988 | Yamada et al. | |
| 4,824,159 A * | 4/1989 | Fluharty et al. | 359/841 |
| 4,881,766 A | 11/1989 | Schmidt et al. | |
| 4,883,349 A | 11/1989 | Mittelhauser | |
| 4,896,859 A | 1/1990 | Polzer et al. | |
| 4,929,074 A | 5/1990 | Urban | |
| 4,934,802 A * | 6/1990 | Fluharty et al. | 359/841 |
| 4,951,912 A | 8/1990 | Manzoni | |
| 4,957,359 A | 9/1990 | Kruse et al. | |
| D315,710 S | 3/1991 | Ropolo | |
| 4,998,814 A | 3/1991 | Perry | |
| 5,044,739 A | 9/1991 | Do Espirito Santo | |
| 5,074,653 A | 12/1991 | Mittelhäuser | |
| 5,098,058 A | 3/1992 | Polzer et al. | |
| 5,115,352 A * | 5/1992 | Santo | 359/865 |
| 5,137,247 A | 8/1992 | Lang et al. | |
| 5,210,652 A * | 5/1993 | Perkinson | 359/841 |
| 5,227,924 A | 7/1993 | Kerper | |
| 5,268,795 A | 12/1993 | Usami | |
| 5,268,797 A | 12/1993 | Santo | |
| 5,295,021 A | 3/1994 | Swanson | |
| 5,327,294 A | 7/1994 | Koske et al. | |
| 5,330,149 A | 7/1994 | Haan et al. | |
| 5,363,245 A | 11/1994 | Borello | |
| 5,432,640 A | 7/1995 | Gilbert et al. | |
| 5,477,390 A | 12/1995 | Boddy et al. | |
| 5,477,391 A | 12/1995 | Boddy | |
| 5,483,385 A | 1/1996 | Boddy | |
| 5,566,030 A | 10/1996 | Yue | |
| 5,576,884 A | 11/1996 | Ise et al. | |
| 5,604,644 A | 2/1997 | Lang et al. | |
| 5,615,054 A | 3/1997 | Lang et al. | |
| 5,621,577 A * | 4/1997 | Lang et al. | 359/812 |
| 5,647,651 A | 7/1997 | Kim | |
| 5,657,174 A | 8/1997 | Boddy | |
| D385,243 S | 10/1997 | Lang | |
| 5,687,035 A * | 11/1997 | Lang | 359/864 |
| D387,317 S | 12/1997 | Lang | |
| 5,703,732 A | 12/1997 | Boddy et al. | |
| 5,775,146 A | 7/1998 | Edwards et al. | |
| 5,786,948 A | 7/1998 | Gold | |
| D397,072 S | 8/1998 | Hellhake et al. | |
| 5,798,882 A * | 8/1998 | Lang | 359/872 |
| D397,658 S | 9/1998 | Kim et al. | |
| 5,823,501 A | 10/1998 | Schmidt et al. | |
| D403,286 S | 12/1998 | Kim et al. | |
| D403,287 S | 12/1998 | Kim et al. | |
| D405,745 S | 2/1999 | Stirling | |
| 5,880,895 A | 3/1999 | Lang et al. | |
| 5,889,627 A | 3/1999 | Englander et al. | |
| D409,127 S | 5/1999 | Kim et al. | |
| 5,959,790 A | 9/1999 | Hempelmann | |
| 5,963,127 A * | 10/1999 | Lang et al. | |
| 5,974,842 A | 11/1999 | Schluck et al. | |
| 6,019,475 A | 2/2000 | Lynam et al. | |
| 6,070,846 A | 6/2000 | Shimokobe et al. | |
| 6,079,858 A | 6/2000 | Hicks | |
| D431,219 S | 9/2000 | Englander et al. | |
| 6,349,982 B2 | 2/2002 | Fayngersh et al. | |
| 6,352,231 B1 * | 3/2002 | Lang et al. | |
| 6,390,631 B1 * | 5/2002 | Lang et al. | |
| 6,390,634 B1 * | 5/2002 | Lang et al. | |
| 6,467,917 B1 * | 10/2002 | Lang et al. | |

OTHER PUBLICATIONS

U.S. patent application No. 09/045,098, filed Mar. 20, 1998 (Attorney Docket No. LMX–45).

European Search Report, dated Feb. 27, 2002.

English Translation of German Patent No. DE 32 07 925 A1.

U.S. Patent Application Publication, Watts et al., Pub. No. US 2002/0017120AI, Pub. Date Feb. 14, 2002.

* cited by examiner

HORN SHAPED REARVIEW MIRROR WITH SUPPLEMENTAL A MIRROR

BACKGROUND OF THE INVENTION

The invention concerns a horn shaped rear view mirror assembly for commercial vehicles, in particular, for buses.

For buses, more and more attention-getting mirror designs are being employed. At least one of these shows a mirror construction installed far forward, extending outwardly from the upper ends of the A-columns of the bus body. In the case of these outlying designs—the so-called "horn mirrors"—a main mirror and supplementary mirrors are integrated for the driver's supervision of the entry area and the front zone which is not visible to the said driver.

A representation of such a horn shaped rearview mirror assembly has been brought into public knowledge by DE-44 29 604 A1. Another such horn shaped rearview mirror assembly is known from EP-A-0 865 967. The latter encompasses a support arm, mountable on the vehicle body having a carrying tubular structure as the basic element, a main mirror in a housing fastened on the free end of the tubular structure, and an advantageous motorized, adjustable mirror pane located in said housing. Further, EP-A-0 865 967 discloses a molded component, which supports supplementary mirrors and envelopes as a cover the tubular structure between its body end and the main mirror.

In this known rearview mirror assembly, the main mirror with its housing and the support arm with the molded component, along with the therein integrated supplementary mirror, make up two separate construction components, which are connected with one another. This two-part structure leads to certain limitations in the design of such horn shaped rearview mirrors and likewise leads to a sectional structure. Moreover, the mounting of such a horn shaped mirror becomes complex through the multi-part assembly.

OBJECTIVES AND SUMMARY OF THE INVENTION

Thus it is the purpose of the present invention to bring the known horn shaped rearview mirror of EP-A-0 865 967 into a more compact form.

The achievement of this purpose is accomplished through the features of the present invention.

In accord with the invention, the housing of the main mirror is integrated into the molded component, and the main mirror and at least one supplementary mirror are mounted in a single mirror head. By means of dispensing with the separation between the main mirror and the supplemental mirror a compact and elegant mirror design is possible. The compact form with a mirror head possesses also additional advantages, since whistling noise engendered by the wind while traveling is avoided. Such noise can occur in the two-part design in accord with the present state of the technology. Also, in the matter of the air resistance, this is improved by the more compact mirror head.

In accord with a preferred embodiment of the invention, a single supplementary mirror is provided for the monitoring of the zone in front of the vehicle and the zones left and right between the forward end of the vehicle and the front axle of the vehicle. In this way, by means of one mirror, the function of the previous two mirrors is taken over and at the same time a more compact construction is made possible. Further, from the use of one instead of two supplementary mirrors, a substantial ergonomical advantage arises, since now only one supplementary mirror—for two dead angle zones—and one main mirror need be observed.

According to one advantageous aspect, the invention provides a simplified form of the supplementary mirror, with which two different dead angle zones can be monitored.

In accord with a further advantageous aspects of the invention, a cover of the molded component is provided. By means of this cover, first, the molded part with the parts located thereunder are protected, and second, these covers are then lacquered to match the vehicle color.

In accord with another advantageous aspect of the invention, on the mirror head a peripherally encompassing water dispersing rim is provided. Water and dirt, in the case of rainy weather, are prevented by this water dispersing rim from being transported onto the mirror surface by the wind during travel.

In accord with a yet another aspect of the invention, the mirror assembly is so conceived, that the mirror assembly can be caused to fold forward in the direction of the windshield, or fold backwards in the direction of the side windows. With this measure, the mirrors need not be dismounted during the use of drive-thru wash machines.

In accord with yet another aspect of the invention, the mirror assembly, in accord with the invention, is mountable on the vehicle by means of a clamping mechanism, which makes possible a simple demounting, i.e. removal of the mirror assembly from the vehicle. This clamping mechanism is the object of an Application submitted on the same day as the presently submitted Application (Patent Attorney's file designation: P/11ML0309/DE), U.S. application Ser. No. 09/302,822, now U.S. Pat. No. 6,352,231, regarding which, full cognizance will be taken in the present instrument.

Further advantageous aspects of the invention will be found in the remaining subordinate claims.

Further features, details and advantages of the invention are provided in the subsequent description of a preferred embodiment made with the aid of the drawings.

BRIEF DESCRIPTION OF THE DRAWINGS

There is shown in.

DESCRIPTION OF THE PREFERRED EMBODIMENT

Reference will now be made in detail to the presently preferred embodiments of the invention, one or more examples of which are illustrated in the Figures. Each example is provided by way of explanation of the invention, and not meant as a limitation of the invention. For example, features illustrated or described as part of one embodiment can be used on another embodiment to yield yet another embodiment. It is intended that the present invention include such modifications and variations.

Figure 1:
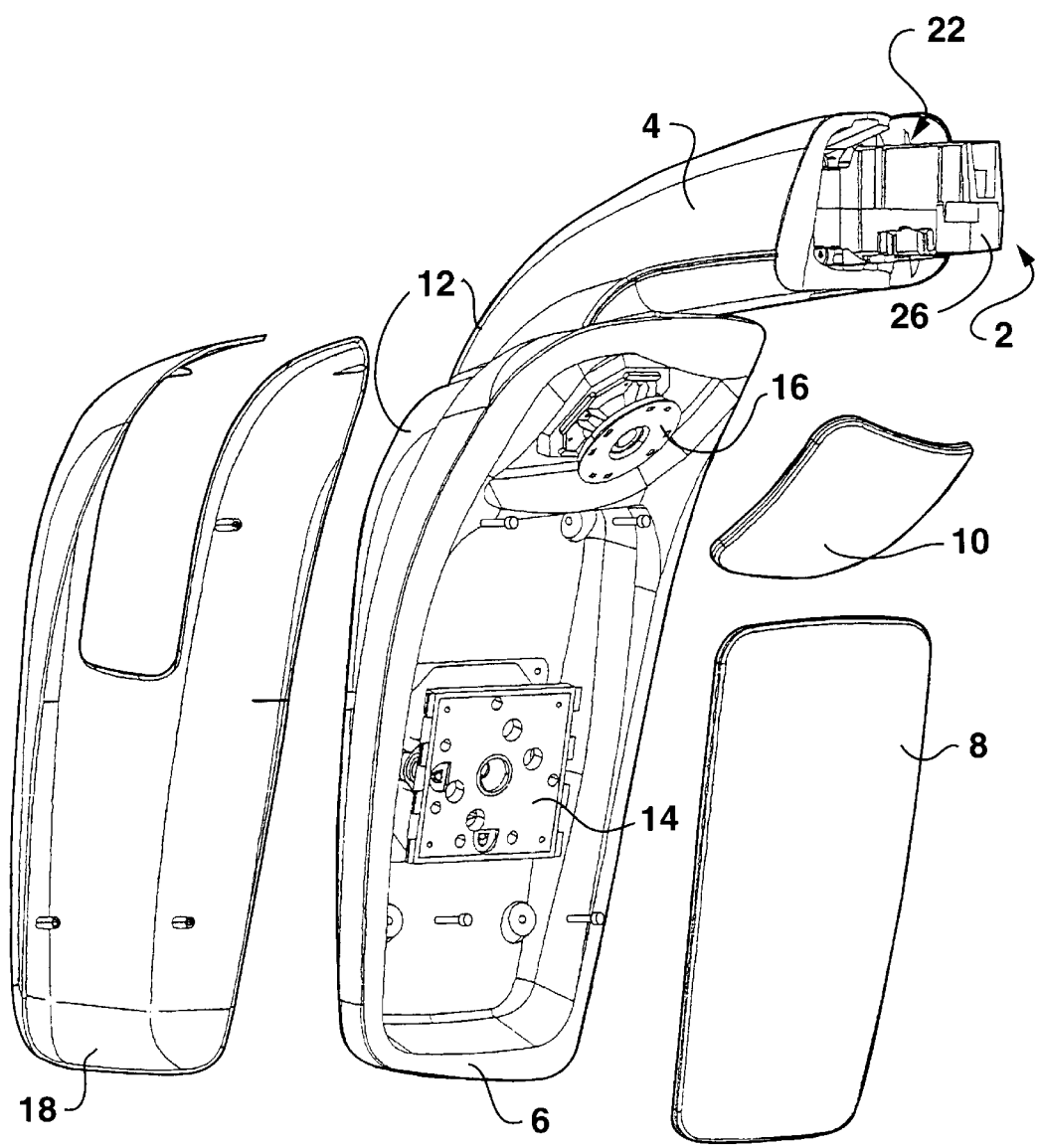
FIG. 1 a general view in an exploded presentation of an advantageous embodiment of the invention, FIG. 2 an exploded view of the clamping mechanism for the mirror shown in FIG. 1, FIG. 3a a side view of the mirror corresponding to FIG. 1, FIG. 3b a top view of the mirror corresponding to FIG. 1, FIG. 4a a top view of a preferred shape of the supplementary mirror, FIG. 4b a sectional view of the supplementary mirror taken along the section line A—A of FIG. 4a, FIG. 5a side view of the adjustment and folding apparatus of the mirror assembly in accord with the present invention, FIG. 5b a sectional view of the elements shown in FIG. 5a, parallel to the plane of the drawing in FIG. 5a, and FIG. 6 a top diagrammatical view of a vehicle showing locations of dead zones relative to a vehicle made visible by the present invention.
Figure 2:
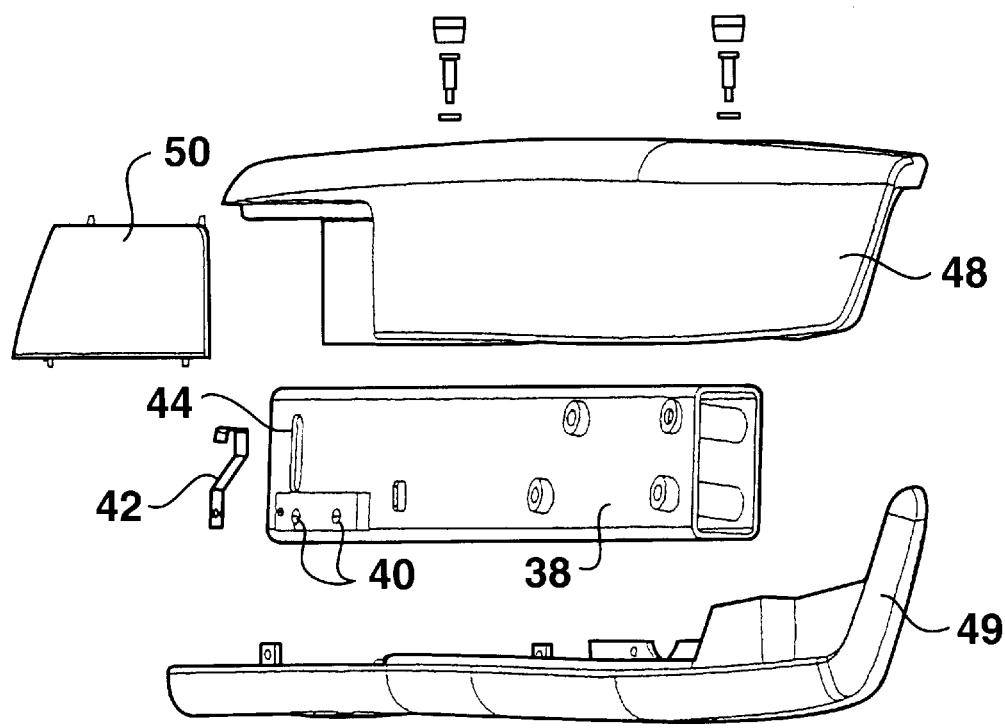
Figure 6:
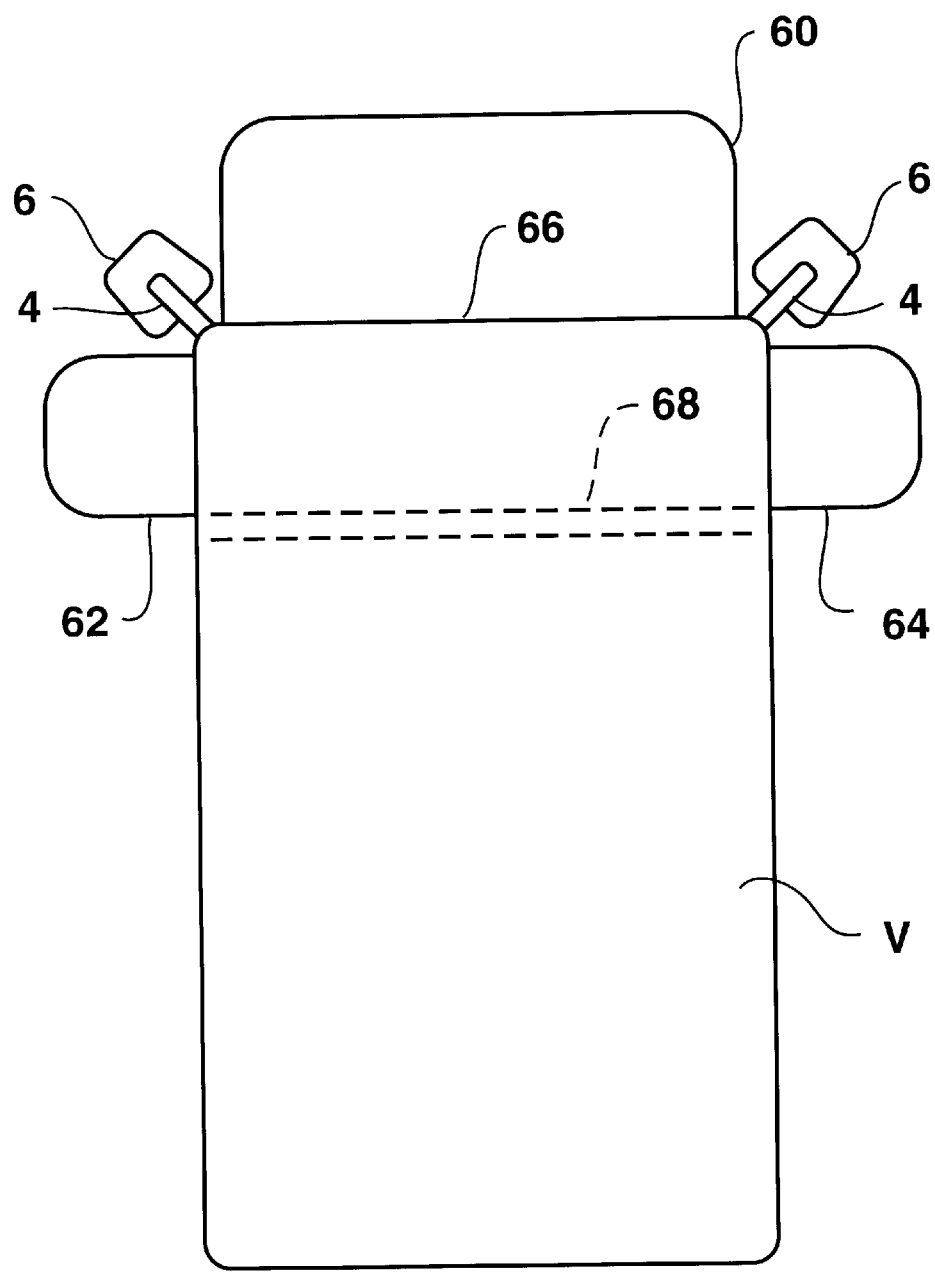

FIGS. 1 and 2 show in perspective, a preferred embodiment of the horn shaped rearview mirror in accord with the present invention, having a support structure 2 for the mirror assembly mounted either left or right on a vehicle v (see FIG. 6). The support structure 2 is connected to a support arm 4.

On the other end of the support arm 4, the main mirror 8 and the supplementary mirror 10 are placed in a common housing or mirror head 6. Support arm 4 and mirror head 6 are comprised of a foamed molded component 12, which is penetrated by a (not shown in detail in FIG. 1) carrier structure 13, as this is also presented in EP-A-0 865 967. In this matter, reference is to be made to said EP-A-0 865 967. The vehicle end of the carrier structure 13 is to be seen in FIGS. 5a and 5b. Main mirror 8 and supplementary mirror 10 are mounted in the common housing, i.e. mirror head 6, on corresponding adjustment apparatuses 14 and 16. The mirror head 6 is covered for protection from the direction of travel by means of the cover 18, which may be lacquered in the same color as the vehicle.

Figure 3A:
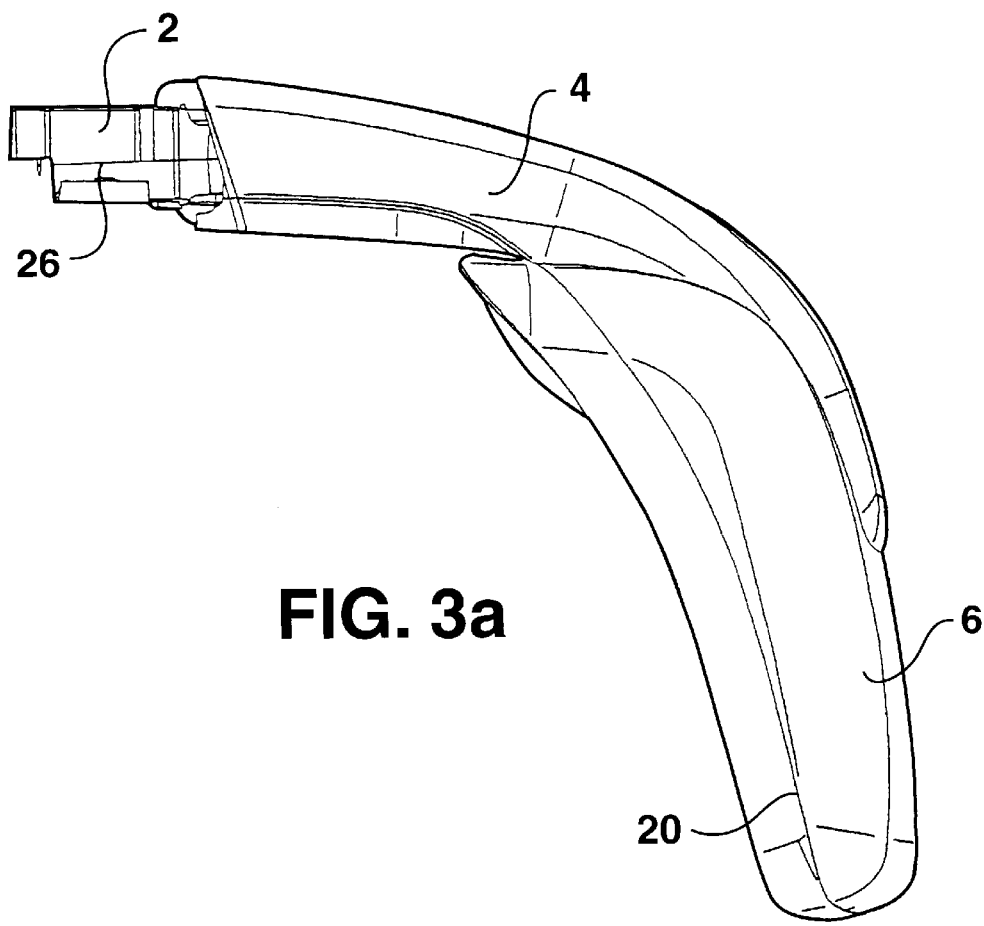
Figure 3B:
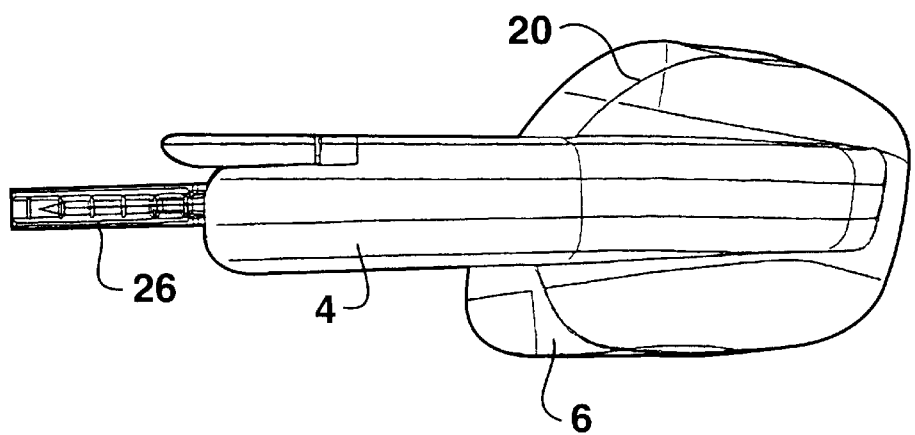

In FIGS. 3a and 3b is shown a peripherally disposed water dispersion rim 20 on the mirror head 6. This water dispersion rim 20 prevents the wind due to traveling from driving water and dirt upon the surfaces of the main mirror 8 and supplementary mirror 10.

Figure 4A:
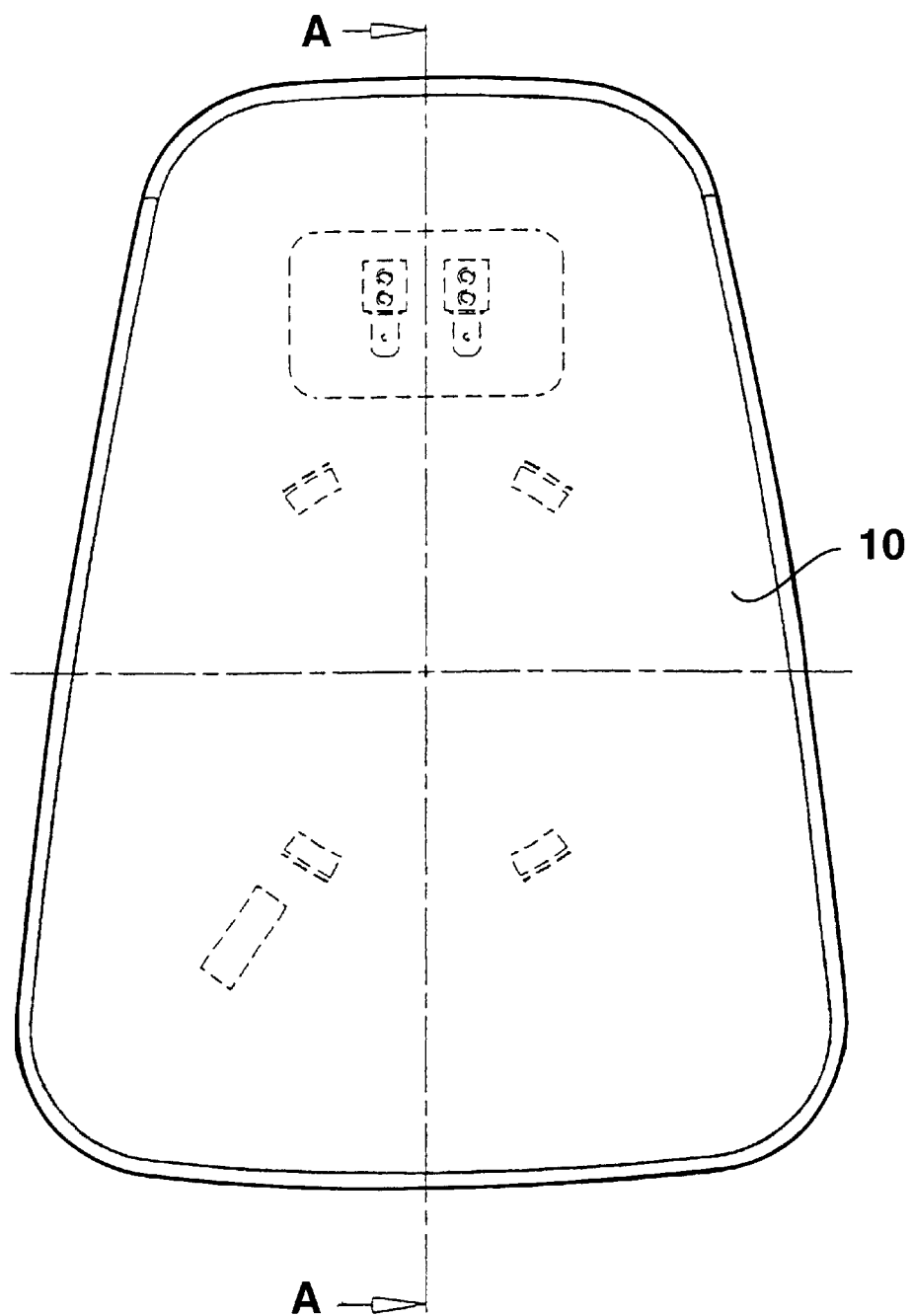
Figure 4B:
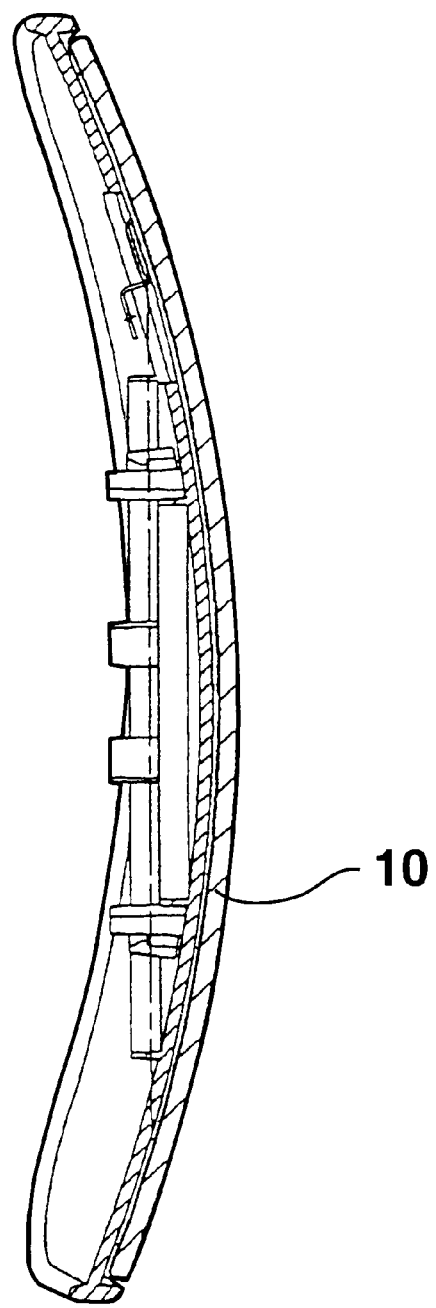

FIG. 4a shows a plan view of the supplementary mirror 10, and FIG. 4b shows a section along the section line A—A in FIG. 4a. The supplementary mirror 10 is domed, trapezoidal in shape and possesses rounded off corners. This shape assures that the supplementary mirror 10 allows the monitoring of two dead angle zones, namely the zone 60 in front of the vehicle and the zone on the sides of the vehicle 62, 64 between the front end 66 and the forward axle 68 (see FIG. 6).

The vehicle end of the support arm 4 is connected to an adjustment and folding apparatus 22, by means of which, the basic adjustment of the mirror assembly can be made, and by means of which the mirror assembly can be folded forward, that is, in the direction of the windshield, or toward the rear, that is, in the direction of the side windows. The adjustment and folding apparatus 22 includes a hinge pivot 24 with two pivoting arms, whereby one pivot arm is the vehicle end of the carrying structure 13 and the other pivot arm is the insertable component 26 (see FIGS. 5a and 5b).

Figure 5A:
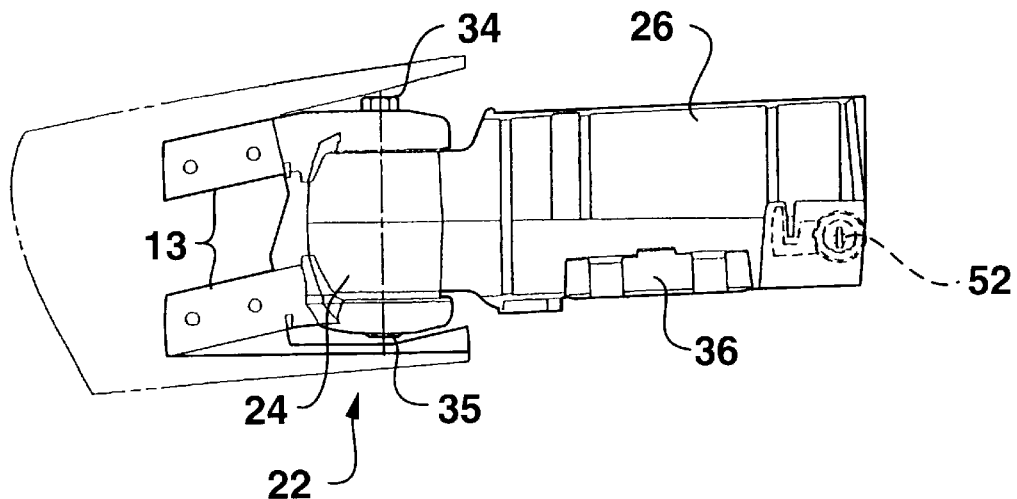
Figure 5B:
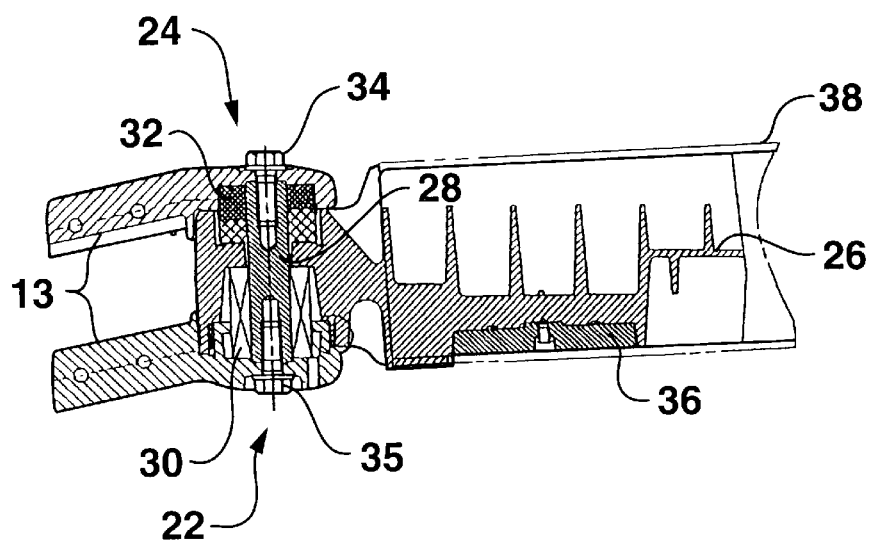

As may be seen in FIG. 5b, the hinge pivot 24 of the adjustment and folding apparatus 22 is held together by a hinge bolt 28, which penetrates a cup spring 30 and stop-washers 32 and 33. The hinge bolt 28 is fixed in place by two screws 34 and 35 located respectively, above and below said hinge bolt 28. The stop washers 32 and 33 are pressed against one another by the cup spring 30 whereby the mirror assembly is thus limited to a specified angular position.

The support structure 2 is made as a clamping assembly and is comprised of the insertable component 26, on which a clamp wedge 36 is slidingly affixed, and a rectangular shaped clamp receptacle 38 is also thereon attached. The clamp receptacle 38 will be screwed on to the body of the vehicle. During the mounting of the mirror assembly, the insertable component 26 is pushed into the clamp receptacle 38. The clamping wedge 36 is firmly secured to the clamp receptacle 38 and the insertable component 26 by clamping screws 40. The clamp wedge 36 is slidable in a direction at right angles to the entry direction of the insertable component 26 into the clamp receptacle. By means of the sliding of the clamp wedge 36, the insertable component 26 is moved upward, and the clamp wedge 36 presses downward against the upper/lower limits of the clamp receptacle 38.

As shown in FIG. 2, for security, in addition, a snap-in detent arrangement is provided, which includes a snap-in, springlike element 42 affixed to the clamp receptacle 38. This snap-in detent element 42 protrudes through a corresponding penetrative opening 44 in the clamp receptacle 38.

Upon the insertion of the insertable component 26 into the clamp receptacle 38, the snap-in detent element 42 is retracted, i.e. pressed back, and seats itself in a corresponding recess in the insertable component 26. The support structure 2 is covered by an upper and a lower covering, respectively 48, 49 as well as a mounting cover 50. The mounting cover 50 covers the clamp screws 40 and the snap-in detent element 42. In the case of demounting of the mirror assembly, more exactly, regarding the demounting of the mirror head 6 with the support arm 4, principally, the mounting cover 50 must be removed and the screws loosened.

In FIG. 5a is shown a key-activated locking mechanism 52 which is disposed on the clamp receptacle 38 and through which the insertable component 26 is secured in the clamp receptacle 38. The locking device presents a safety measure against theft.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A horn shaped rearview mirror assembly for a vehicle, the rearview mirror assembly comprising:
   a support structure for mounting the mirror assembly to the vehicle;
   a support arm including a carrier structure having a vehicle end and a free end, the vehicle end connected to the support structure, the support arm also including a molded component secured to the carrier structure, the molded component including a mirror housing;
   a key activated locking apparatus disposed on the support structure for selectively locking the support arm to the vehicle;
   a main rearview mirror affixed to the mirror housing for providing a driver of the vehicle a rearview of the vehicle; and
   only one supplemental mirror affixed to the mirror housing above the main mirror for providing the driver a direct view of at least two dead zones disposed about the vehicle.

2. A rearview mirror assembly as in claim 1, wherein the supplemental mirror is configured to provide a view of a dead zone in front of the vehicle and a dead zone on the side of the vehicle between the front end of the vehicle and the front axle of the vehicle.

3. A rearview mirror assembly as in claim 2, wherein the supplemental mirror includes a domed mirror surface having a perimeter substantially in the form of a trapezoid.

4. A rearview mirror assembly as in claim 1, wherein the main mirror and the supplemental mirror are adjustable by electric motors.

5. A rearview mirror assembly as in claim 1, wherein the mirror housing has a forward side, and further including a cover which protects the forward side.

6. A rearview mirror assembly as in claim 5, wherein the cover is of one piece.

7. A rearview mirror assembly as in claim 5, wherein the mirror housing includes a water dispersing rim.

8. A rearview mirror assembly as in claim 1, wherein the carrier structure is a tubular structure and the molded component is a foamed molded component comprised of a two-component material.

9. A rearview mirror assembly as in claim 1, further including an adjustment mechanism attached to the support arm, the adjustment mechanism configured to allow the support arm to be pivoted relative to the vehicle.

10. A rearview mirror assembly as in claim 1, wherein, the support structure includes a clamping mechanism housing a clamp receptacle affixed to the vehicle, an insertable component inserted into the clamp receptacle in an inserting direction, and a slidably installed clamping wedge on the insertable component, the wedge, upon pushing of the insertable component, clampingly locks the insertable component and the clamping wedge to the clamp receptacle.

11. A rearview mirror assembly as in claim 10, wherein the clamping wedge is slidable on the insertable component in a direction at right angles to the inserting direction of the insertable component.

12. A rearview mirror assembly as in claim 10, wherein the clamp receptacle is a rectangular shaped tube segment.

13. A rearview mirror assembly as in claim 10, wherein the support structure includes a snap-in detent apparatus.

14. A rearview mirror assembly as in claim 13, wherein the snap-in detent apparatus includes a snap-in spring element affixed to the clamp receptacle and which snaps into a corresponding recess in the insertable component.

15. A rearview mirror assembly as in claim 10, wherein the clamping wedge is movable in a clamping direction by clamping screws.

16. A rearview mirror assembly as in claim 15, wherein the clamping screws are screwed into tapped borings in the clamp receptacle.

17. A horn shaped rearview mirror assembly for a vehicle, the rearview mirror assembly comprising:

a support structure for mounting the mirror assembly to the vehicle;

a support arm including a carrier structure having a vehicle end and a free end, the vehicle end connected to the support structure, the support arm also including a molded component secured to the carrier structure, the molded component including a mirror housing;

a key activated locking mechanism disposed on the support structure for selectively locking the support arm to the vehicle;

a main rearview mirror affixed to the mirror housing for providing a driver of the vehicle a rearview of the vehicle; and only one supplemental mirror affixed to the mirror housing above the main mirror for providing the driver a direct view of a first dead zone in front of the vehicle and a second dead zone on the side of the vehicle between the front end of the vehicle and the front axle of the vehicle.

18. A rearview mirror assembly as in claim 17, wherein the supplemental mirror includes a domed mirror surface having a perimeter substantially in the form of a trapezoid.

19. A rearview mirror assembly as in claim 17, wherein the carrier structure is a tubular structure and the molded component is a foamed molded component comprised of a two-component material.

* * * * *

UNITED STATES PATENT AND TRADEMARK OFFICE
CERTIFICATE OF CORRECTION

PATENT NO.    : 6,544,436 B2
DATED         : April 8, 2003
INVENTOR(S)   : Yoshihiko Morikawa, Kazunori Senbiki, and Nobuhiro Yamazaki It is certified that error appears in the above-identified patent and that said Letters Patent is hereby corrected as shown below:

<u>Title page,</u>
Item [73], Assignee, information should read --

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,554,436 B1  
DATED         : April 29, 2003  
INVENTOR(S)   : Heinrich Lang, Albrecht Popp and Jurgen Pfanz It is certified that error appears in the above-identified patent and that said Letters Patent is hereby corrected as shown below:

<u>Title page, Item [54] and Column 1, lines 1 and 2,</u>
Please replace the title with the following:

-- HORN SHAPED REARVIEW MIRROR WITH SUPPLEMENTAL MIRROR --

Signed and Sealed this

Sixteenth Day of September, 2003

JAMES E. ROGAN
*Director of the United States Patent and Trademark Office*